July 13, 1943. E. E. WILSON 2,323,955
RESONANCE UNIT
Filed July 25, 1930 2 Sheets-Sheet 1

Inventor
Ernest E. Wilson

By Blackmore, Spencer & Finch
Attorneys

July 13, 1943.    E. E. WILSON    2,323,955
RESONANCE UNIT
Filed July 25, 1930    2 Sheets-Sheet 2
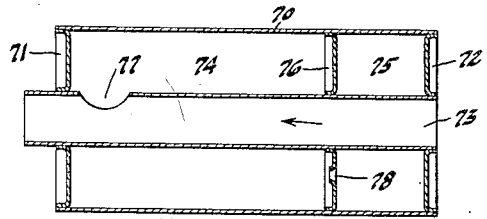
Fig. 5
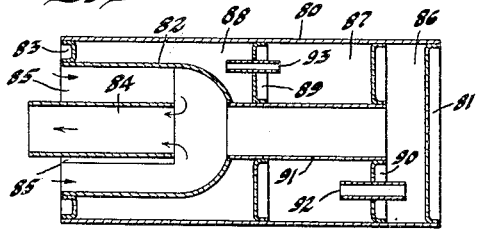
Fig. 6
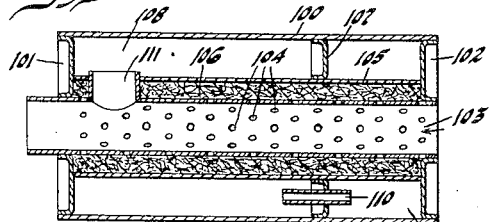
Fig. 7
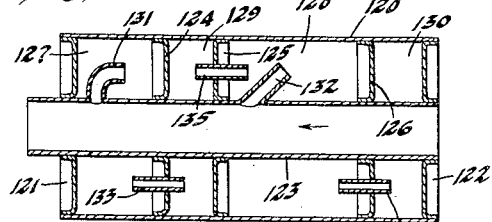
Fig. 8
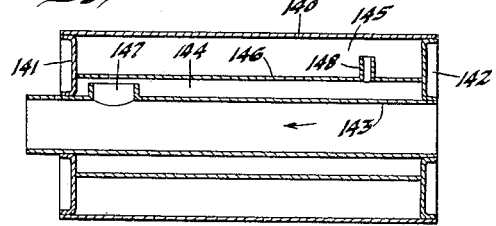
Fig. 9
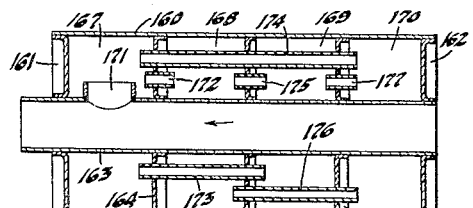
Fig. 11
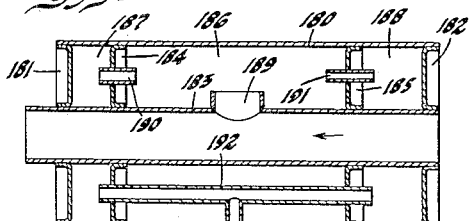
Fig. 12
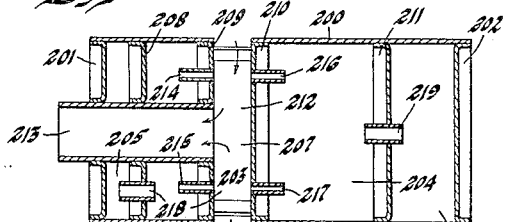
Fig. 13
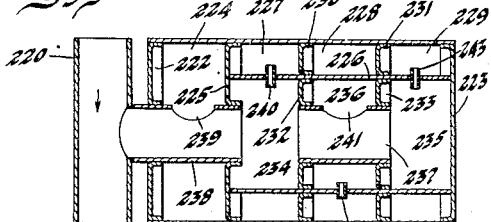
Fig. 14
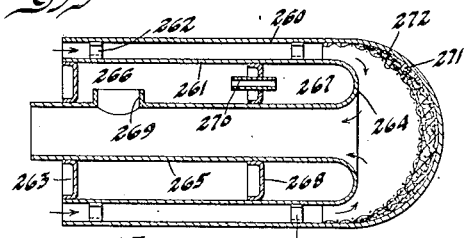
Fig. 15
Fig. 10
Inventor
Ernest E. Wilson
By Blackmore, Spencer & Fink
Attorneys Patented July 13, 1943

2,323,955

UNITED STATES PATENT OFFICE 2,323,955

RESONANCE UNIT

Ernest E. Wilson, Detroit, Mich., assignor to General Motors Corp., Detroit, Mich., a corporation of Delaware Application July 25, 1930, Serial No. 470,700

33 Claims. (Cl. 181—48)

For the reason that they can be so constructed that they will offer practically no resistance to the passage of gases therethrough, silencers of the resonator type are particularly suitable for use in muffling the noises issuing from the induction systems and the exhaust systems of internal combustion engines. Each simple resonator (the term "simple resonator" is to be understood to include a single resonance chamber and the passage which connects it with the passage through which sound or other pressure waves pass) of a resonator silencer will theoretically respond only to periodic vibrations of a particular frequency, which depends upon the volume of the resonance chamber and the acoustical conductivity of the passage through which it communicates with the main conduit, and will, consequently, theoretically function to damp out only periodic vibrations of a particular frequency. While, actually, a silencer of the type described in which there is provided only a single resonance chamber of a particular volume which is connected to a passage through which sound waves are passing by a passage of a particular acoustical conductivity will attenuate, not only periodic vibrations of a particular frequency, but also periodic vibrations of somewhat higher and lower frequencies, and, while such a silencer can be made to attenuate periodic vibrations of any particular frequencies by adding thereto additional simple resonators, it cannot be made to attenuate all of the periodic vibrations, or completely to attenuate the complex vibrations which result from the mutual super-position of the constituent periodic vibrations upon each other, which affect the ear as a noise or noises, as it must be if it is to be capable of being used satisfactorily to muffle the noises issuing from the induction system or the exhaust system of an internal combustion engine, unless there are incorporated therein a relatively large number of resonators and/or resonators of relatively large size which, of course, in many instances, render the silencer so large that it is impractical.

Broadly speaking, it is one of the principal objects of this invention to provide a silencer of the resonator type, which includes only a relatively small number of relatively small resonators which are so arranged that the silencer will be capable of attenuating all of the periodic vibrations which constitute the complex vibrations which affect the ear as a noise or noises, and, consequently, of eliminating the noise or noises. To attain this object, I may provide, in addition to a simple resonator or simple resonators which communicate with the main conduit through which the vibrations constituting the sound waves which are to be attenuated travel, in a silencer of the resonator type, a secondary resonance chamber, or a plurality of secondary resonance chambers, which communicate with the primary resonance chamber or with each, or any one or more, of the primary resonance chambers, and/or a sub-primary resonance chamber, or a plurality of sub-primary resonance chambers, which communicate with the passage or with each, or any one or more, of the passages through which the primary resonance chamber or chambers communicate with the main conduit. To the same end, I may provide, in addition to or instead of the secondary resonance chamber, or any one or more of the secondary resonance chambers, and/or the sub-primary resonance chamber, or any one or more of the sub-primary resonance chambers, another resonance chamber, or a plurality of other resonance chambers (which may be entirely independent one of the other or of which any two or more may communicate one with the other) which may communicate with the primary, secondary or sub-primary resonance chamber or with each or any one or more of the primary, secondary or sub-primary resonance chambers or with the passage through which any pair of the resonance chambers are inter-connected or with each or any one or more of the passages through which any two or more pairs of the resonance chambers are inter-connected. Furthermore, and to the same end, I may provide, in addition to or instead of any one or more or all of the additional resonance chambers, passages to connect the main conduit or any one or more or all of the passage or passages, or chamber or chambers with the atmosphere or directly to inter-connect any two of the passage or passages, or chamber or chambers, not otherwise directly connected.

A silencer of the resonator type which is constructed in accordance with my invention may be made of relatively small size and yet capable of attenuating all of the periodic vibrations which constitute the complex vibrations which affect the ear as a noise or noises which it is desired to eliminate and is, consequently, eminently suitable for use in muffling the noises issuing from the induction system or the exhaust system of an internal combustion engine, as well as other noises.

Generally speaking, the type and range of complex vibrations which a silencer constructed in accordance with my invention will damp out, may be varied by varying the number and characteristics of the resonators of which it is made and by varying the inter-connections between the several resonators and the main conduit.

During the course of my experiments with silencers of the resonator type, I have discovered that when properly designed silencers of this type are used to muffle the noises issuing from the induction system or the exhaust system of an internal combustion engine, the power of the engine is increased. This remarkable result seems to be due to the fact that when a resonance unit, i. e., a resonator or a plurality of interconnected resonators) is placed in communication with the induction system of an internal combustion engine, the characteristics of the pressure variations in the induction system and, consequently, the ram characteristics of the induction system are changed and, if a properly designed resonance unit is employed, are changed in such a manner that a larger volume of combustible mixture is drawn into each cylinder during the suction stroke of the piston therein; and to the fact that when a resonance unit is placed in communication with the exhaust system of an internal combustion engine, the characteristics of the pressure variations in the exhaust system and, consequently, the scavenging characteristics of the exhaust system are changed, and, if a properly designed resonance unit is used, are changed in such a manner that the cylinders are more thoroughly freed from exhaust gases during the exhaust strokes of the pistons therein. My experiments seem to indicate that when a resonance unit is designed most effectually to silence the noises issuing from the induction system or the exhaust system of an internal combustion engine, it will be most effectual in producing the desired effect on the power of the engine, although I apprehend that more exhaustive experimentation may prove that it is desirable to employ a somewhat differently designed resonance unit when its primary purpose is to increase the power of the engine than when its primary purpose is to silence the noises issuing from the induction system or the exhaust system of the engine.

From what has been said in the paragraph next preceding this, it will be apparent that, in addition to the features hereinbefore mentioned, my invention comprehends broadly the combination with an internal combustion engine of a resonance unit, which consists of one or more resonators, so designed and connected with the induction system or the exhaust system of an internal combustion engine as to silence the noises issuing from the induction system or the exhaust system of the engine and/or to affect the ram characteristics of the induction system or the scavenging characteristics of the exhaust system.

For a better understanding of the nature, the objects and the scope of the present invention, reference is made to the following specification in which there are described the several embodiments of my invention which are illustrated in the accompanying drawings.

Figures 4 to 15, inclusive, are central longitudinal sections through modified forms of resonance units in which are embodied my invention.

Figure 1:
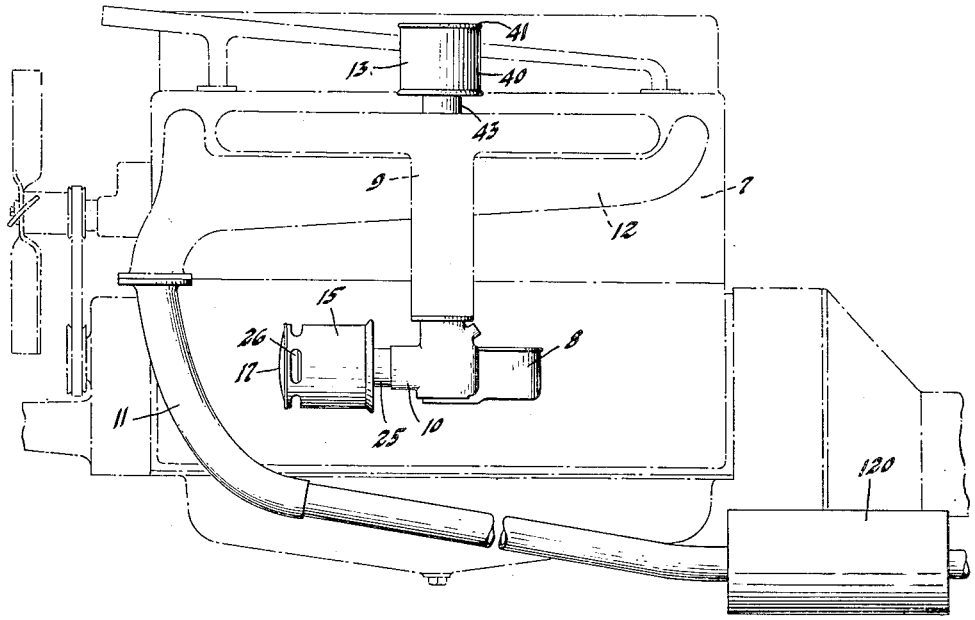
Figure 1 is a side elevation of an internal combustion engine to which there are connected three resonance units in which my invention is embodied.
Figure 2:
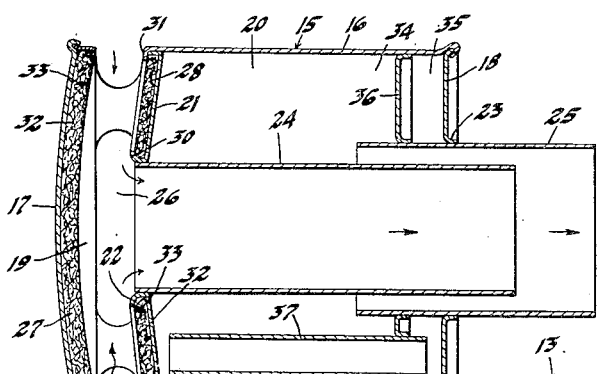
Figure 2 is a central longitudinal section through one of the resonance units which is shown in Figure 1.
Figure 3:
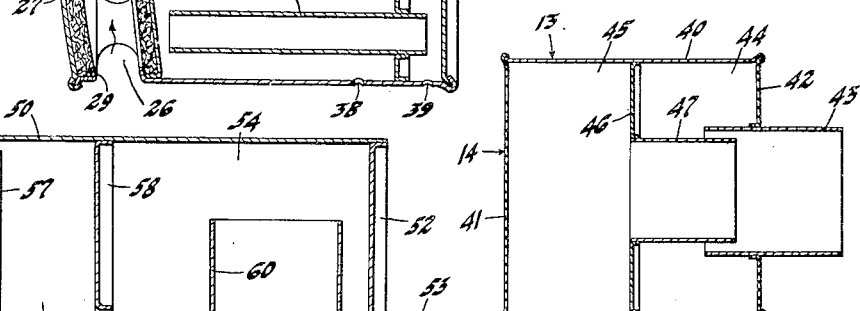
Figure 3 is a central longitudinal section through another of the resonance units which is shown in Figure 1.

In Figures 1, 2 and 3 of the drawings, the reference character 7 indicates an internal combustion engine on which there is provided a carburetor 8 which is connected to the cylinders of the engine by an intake manifold 9 and on which there is provided an air intake conduit 10, and the reference character 11 the exhaust pipe of the engine which is connected to the cylinders of the engine by an exhaust manifold 12. To the body of the intake manifold 9, there is connected a resonance unit 13 in which there is embodied my invention; to the exhaust pipe 11, there is connected a second resonance unit 120 in which there is embodied my invention; and to the air intake conduit 10 of the carburetor 8, there is connected a third resonance unit 15 in which is embodied my invention.

The resonance unit 15, which is shown in Figures 1 and 2 of the drawings, includes a cylindrical shell 16 over whose opposite ends there are secured heads 17 and 18 and which is subdivided longitudinally into two compartments 19 and 20 by a partition 21. Through the partition 21, there extends a circular central opening which is bounded by an outwardly extending flange 22 and through the head 18, there extends a circular central opening of larger diameter than the opening through the partition 21 and which is surrounded by a flange 23. To the flange 22, there is secured one end of a tube 24 which extends through the interior of the shell 16 and through the opening in the head 18. To the flange 23, there is secured the intermediate portion of a tube 25 which is of larger diameter than the tube 24 and which surrounds and is spaced circumferentially from the adjacent end thereof. As is shown in the drawings, the tube 25 extends outwardly beyond the tube 24.

Through the side wall of the shell 16, there extend into the compartment 19 an annular series of openings 26 through which air may pass in a straight line and without encountering any obstruction from the atmosphere to a point opposite the tube 24 and, thence, into the tube 24. The end walls 17 and 21 of the compartment 19 are lined with mats 27 and 28 of sound absorbing material which are held against the end walls by flanges 29 and by flanges 30 and 31, respectively. The mats of sound absorbing material preferably consist of mats of hair felt 32 covered by layers of burlap or other porous fabric 33 which are preferably secured to the mats of hair felt during the felting operation, or by "punching," or by an adhesive, but may be constructed of any other suitable material or combinations of materials.

The interior of the compartment 20 is divided into a primary resonance chamber 34 and a secondary resonance chamber 35 by an annular partition 36 whose outer and inner peripheries are secured, respectively, to the shell 16 and the tube 25. Communication between the chambers 34 and 35 is established by a tube 37 which extends through an opening in, and is secured to, the partition 36. Through the side wall of the shell 16 there extends a small opening 38 which opens into the chamber 34 and a small opening 39 which opens into the chamber 35.

As is shown in Figure 1 of the drawings, the resonance unit 15 is adapted to be installed on the air intake conduit of the carburetor of an internal combustion engine by inserting one end of the tube 25 in the carburetor air intake conduit and suitably securing it thereto. In installing the resonance unit, care should be taken to position it so as to locate the small openings 38 and 39 in the lower side of the wall thereof so that they may function as drain openings. When the resonance unit is so installed and the engine is operating, the suction created by the pistons on their suction strokes, will draw air through the openings 26, into the compartment 19, and, thence, into the tube 24, whence it will pass, through the tube 25, the carburetor and the intake manifold, into the cylinders of the engine. Since, as is apparent from the drawings, there is an unobstructed path through the resonance unit into the air intake conduit of the carburetor, the resonance unit will offer practically no resistance to the passage of air therethrough.

When an internal combustion engine is operating, there is set up in the gases within the cylinders and other parts of the induction system, complex vibrations which are transmitted, through the current of gases which is flowing through the carburetor and intake manifold, to the atmosphere. These complex vibrations, generally speaking, are of two types, viz., high frequency vibrations which are present throughout the range of speed of the engine and affect the ear as a "hiss" and low frequency vibrations which occur continuously or periodically throughout the range of speed of the engine and affect the ear as a noise of disagreeable tone and volume. These noises may be eliminated by attenuating the complex vibrations or the periodic vibrations from which they result before they reach the atmosphere. To accomplish this result without appreciably restricting the flow of air to the carburetor and engine cylinders, the resonance unit shown in Figures 1 and 2, as well as those shown in the other figures of the accompanying drawings, are primarily designed.

When the resonance unit shown in Figures 1 and 2 of the drawings is connected to the air intake conduit of the carburetor of the engine in the manner described above, the low frequency vibrations, which are set up in the current of gases which is flowing through the carburetor and intake manifold when the engine is operating at such a speed that the vibrations affect the ear as a noise of a tone and volume which it is desirable to eliminate, cause the gases in the primary and secondary resonance chambers 34 and 35 to vibrate in resonance therewith, which results in these vibrations being attenuated before they reach the atmosphere and, consequently, in the elimination of the noise.

Vibrations which affect the ear as noises (including the vibrations which are set up in the current of gases which is flowing through the carburetor and intake manifold of an internal combustion engine when it is operating) are not simple periodic vibrations but are the resultants of the superposition of a number of periodic vibrations of different frequencies one on the other. With this in mind, it will be obvious that to silence noises will in many instances require a resonance unit of relatively large size if one composed of simple resonators is employed. A resonance unit, which is constructed in accordance with my invention can, however, by the proper selection and arrangement of resonators, be made of relatively small size and yet capable of responding to all of the constituent vibrations and, consequently, of entirely attenuating the complex vibrations and muffling the noise.

As I have previously intimated, a resonance unit, which is constructed in accordance with my invention, may be made to silence any noise or noises by properly arranging and interconnecting the proper number of resonators of the proper characteristics. The proper number, characteristics, arrangement and interconnection of resonators which should be employed to silence any particular noise or noises may be determined by experimentation, but I have found that much time and labor can be saved by making use of a parti-mathematical method.

The principal frequency or frequencies of the sound and/or other pressure waves to which a given resonator or resonance unit consisting of a plurality of interconnected resonators which are connected to a passage through which sound and/or other pressure waves are passing will respond and which the resonator or the resonance unit will attenuate may be calculated by the methods set forth in chapter XVI (volume II) of the second edition of "The Theory of Sound," by Lord Rayleigh. A given resonator, as hereinbefore stated, will also respond to and attenuate sound and/or other pressure waves whose frequencies are somewhat higher or lower than the principal frequency of the resonator; and, as hereinbefore intimated, resonance units, which consist of a plurality of resonators, will respond to and attenuate, not only sound and/or other pressure waves whose frequencies correspond to the principal frequencies of the resonance unit, but also, to a remarkable degree, sound and/or other pressure waves whose frequencies lie between the principal frequencies of the resonance unit and somewhat below the lower and above the higher principal frequency of the resonance unit.

The methods of calculating the principal frequency to which a resonator will respond and which the resonator will attenuate, set forth by Lord Rayleigh, can be employed directly to determine the volume of the resonance chamber or the dimensions of the passage through which the resonance chamber of a resonator, which will respond to and attenuate sound and/or other pressure waves of a single frequency, is connected to the passage through which the sound and/or other pressure waves which are to be attenuated pass, if one of these factors is first fixed arbitrarily or by extraneous considerations.

However, the problem of determining the most efficient and economical number and arrangement of the several resonators which constitute a resonance unit which consists of a plurality of resonators, which involves the problem of determining the optimum proportions of the several resonators, which will attenuate sound and/or other pressure waves of a plurality of frequencies or throughout a range of frequencies, obviously cannot be solved directly by the methods set forth by Lord Rayleigh. Any attempt to give any but very general directions as to the method to be used in solving this problem will be useless. However, I may say that generally to arrive at the solution of such a problem I first design two resonators of which both will respond to frequencies within the range of the frequencies which are to be attenuated. If the frequency-volume curve of the noise or other phenomenon resulting from pressure waves which is to be attenuated indicates that the volume of the noise or other phenomenon is substantially equal throughout the range of frequencies of the noise or other phenomenon or that the volume of the noise or other phenomenon adjacent one end of the curve is substantially equal to the volume of the noise or other phenomenon adjacent the other end of the curve, I have found it desirable to design both resonators so that each will individually respond to the mean of the highest and lowest frequencies which are to be attenuated. If, however, the frequency-volume curve of the noise or other phenomenon which is to be attenuated indicates that the volume of the noise or other phenomenon adjacent one end of the curve is appreciably greater than that adjacent the other end of the curve, I have found it desirable to design one or both of the resonators so that they, individually, will respond to a frequency which is nearer the end of the curve at which the volume of the noise or other phenomenon is greater than the mean of the highest and lowest frequencies which are to be attenuated. After thus preliminarily designing the individual resonators, I determine by the methods set forth by Lord Rayleigh, the principal frequencies to which a resonance unit which consists of the two resonators will respond. I have found it desirable that these frequencies should be the frequencies adjacent the opposite ends of the frequency-volume curve of the noise or other phenomenon to be attenuated at which the volume of the noise or other phenomenon is greatest. If, when tested by the methods set forth by Lord Rayleigh, the principal frequencies of the resonance unit are found not to be these, they may obviously be changed by varying the volume of either or both of the resonance chambers or by varying the dimensions of the passage which connects the two resonance chambers and/or the dimensions of the passage through which the primary resonance chamber is to be connected to the passage through which the sound and/or other pressure waves which are to be attenuated pass. If the volume of one chamber is changed without changing the dimensions of the communicating passage and without modifying the other resonator, both of the principal frequencies of the resonance unit will be increased if the volume is decreased and decreased if the volume is increased. If the dimensions of the passage connecting the two resonance chambers are changed with respect to the dimensions of the passage through which the primary resonance chamber is adapted to be connected to the passage through which the sound and/or other pressure waves are travelling, in such a manner as to change the relative acoustic conductivity (it is understood that the term "acoustic conductivity" as used here and hereinafter is used in the same sense that the term "conductivity" is used in the chapter of Lord Rayleigh's book hereinbefore mentioned) of one of the passages with respect to that of the other, and the volumes of one or both of the resonance chambers also changed so as to maintain the individual frequencies of the resonators constant, the higher principal frequency of the resonance unit will be lowered and the lower principal frequency thereof raised, if the acoustic conductivity of the first-mentioned passage is relatively increased and the higher principal frequency of the resonance unit raised and the lower principal frequency thereof lowered if the acoustic conductivity of the first-mentioned passage is relatively decreased. Changes in the resonance unit other than those specifically mentioned above will produce changes in the principal frequencies of the resonance unit which will depend upon the direction and nature of the changes.

After the optimum design of a resonance unit which consists of two resonance units has been reached, it may be tested, theoretically, by comparing its frequency-volume curve with that of the noise or other phenomenon which is to be attenuated, or, experimentally, by constructing the resonance unit and connecting it to the passage through which the sound and/or other pressure waves which are to be attenuated are passing, to determine whether it satisfactorily attenuates them. If it does not, further modification is in order. This modification may reside in further changes in the characteristics of the two resonators or, particularly if the frequencies to be attenuated extend over a wide range, in the addition of another or other resonators to the unit, and, then in differently interconnecting the several resonators. If there are noises or other phenomena which result from groups of sound and/or other pressure waves whose frequencies do not overlap or from sound and/or other pressure waves which cover a very wide range of frequencies, it may be found desirable to employ two or more resonance units instead of one, each resonance unit being designed to attenuate the sound and/or other pressure waves within a portion of the range of frequencies.

It will be understood that since the solution of the problem of properly designing resonance units of the type with which this invention is concerned frequently involves many "cut-and-try" operations or very elaborate instrumentation, there is much about it that can be learned only by experience.

The methods of designing resonance units to which I have referred above are those which are to be used when the resonance units are designed to function primarily as silencers or to attenuate sound and/or other pressure waves and are also, to the best of my present knowledge, those which should be used when the resonance units are designed to be used on an internal combustion engine primarily for the purpose of increasing its power—i. e., to say that my experiments up to date indicate that when a resonance unit is designed to be most effectual as a silencer on an internal combustion engine, it will operate most effectually to increase the power of the engine—although a single resonator will frequently exert a remarkable effect on the power of the engine on which it is used.

It should here be noted that I have found that to obtain the best results with resonance units, the acoustic conductivity of the passage, through which the primary resonance chamber is connected with the passage through which the sound and/or other pressure waves which are to be attenuated pass, should be made considerably greater than the acoustic conductivity of the passage, through which the sound and/or other pressure waves pass, beyond the junction of the resonance unit therewith in the direction toward which the sound and/or other pressure waves are travelling, and that the range of the frequencies which a given resonance unit will attenuate may be broadened, without however, affecting its principal frequency or frequencies by relatively decreasing the acoustic conductivity of the last-mentioned passage.

While the so-called carburetor "hiss," to which I have hereinbefore referred, may be eliminated by a properly designed resonance unit, I consider it preferable to employ sound absorbing material for this purpose. Accordingly, in the embodiment of my invention which is shown in Figures 1 and 2 of the drawings, I have, as I have hereinbefore stated, lined the interior of the end walls of the compartment 19 with sound absorbing material which will attenuate the sound waves of high frequency which affect the ear as a "hiss."

To illustrate some of the many forms which resonance units in which are embodied my invention may assume I have added Figures 3 to 15 to the drawings. It is to be understood that the structures shown in Figures 3 to 15, as well as those shown in Figures 1 and 2, may be modified in many ways as to details of structure and that modified structural features shown in any of the figures may be incorporated in the resonance units shown in any other of the figures.

In order to render unnecessary separate description of certain features of the several modified embodiments of my invention which are illustrated in Figures 3 to 15, I wish to state that in all of them the passages through which the air flows are indicated by arrows which are pointed in the direction in which the air flows (when the resonance units are connected to the air intake tube of a carburetor) and that the ends of the passages toward which the arrows point are the ends which are adapted to be connected to the carburetor air intake conduit (or other conduit from which the sound and/or other pressure waves which are to be attenuated issue).

It is not necessary, to accomplish the objects of my invention that a resonance unit which is designed for use on the induction system of an internal combustion engine be connected to the air intake conduit of the carburetor. It may be connected to any part of the induction system. For example, it may be connected to the intake manifold, as the resonance unit 13 which is shown in Figures 1 and 3 of the drawings is connected. It should be mentioned here that I have found that when a given resonance unit is connected to the induction system on the engine side of the carburetor it is somewhat less effective as a silencer but somewhat more effective in increasing the power of the engine than when it is connected to the induction system on the atmospheric side of the carburetor.

The resonance unit 13, which is shown in Figures 1 and 3 of the drawings, includes a cylindrical shell 40 and heads 41 and 42 secured over the opposite ends of the shell. Through a central opening in the head 42, there extends a tube 43 whose intermediate portion is secured circumferentially to the head. The interior of the shell 40 is divided into a primary resonance chamber 44 and a sub-primary resonance chamber 45 by a partition 46 in which there is provided a central opening. To the edges of the partition 46 which surround the central opening therein, there is secured one end of a tube 47 whose diameter is less than that of the tube 43 and which extends into the inner end of and is circumferentially spaced from the wall of the tube 43. The chamber 45 is termed a sub-primary resonance chamber, in accordance with the nomenclature hereinbefore adopted, because it communicates, not directly with the primary resonance chamber 44 but with the passage 43 through which the primary resonance chamber 44 is adapted to be connected with the passage through which the sound and/or other pressure waves which are to be attenuated travel. The effect on the characteristics of the resonance unit of providing therein a sub-primary resonance chamber is, as is apparent, somewhat different than that of providing therein a second primary resonance chamber or a secondary resonance chamber.

It will be noted that there is in the resonance unit 13 which is shown in Figures 1 and 3 of the drawings no passage through which gases or sound and/or other pressure waves are adapted to travel—i. e., that this structure is purely and simply a resonance unit. This resonance unit is adapted to be connected to the manifold or other part of the induction system, as shown in Figure 1, by securing it thereto in such a manner that the tube 43 communicates with the interior of the induction system or other passage through which sound and/or other pressure waves are travelling.

Figure 4:
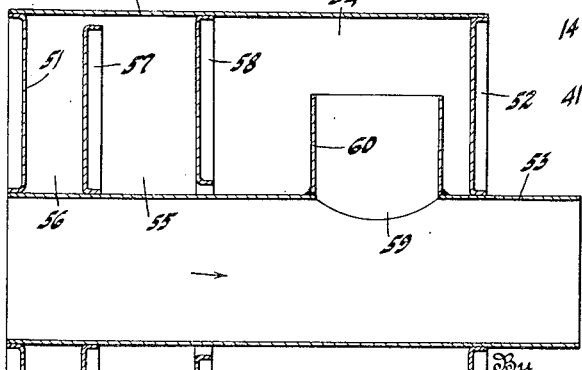

The resonance unit which is shown in Figure 4 of the drawings includes a cylindrical shell 50, heads 51 and 52 secured over the opposite ends of the shell, and a tube 53 which passes eccentrically through the heads and the interior of the shell and which projects outwardly beyond the head 52 to provide an extension which is adapted to be connected to the air intake conduit of a carburetor. The interior of the shell is divided into primary, secondary and tertiary resonance chambers 54, 55 and 56, respectively, by partitions 57 and 58. The partition 57 is secured circumferentially to the tube 53 and is spaced circumferentially from the shell 50 so as to provide an acoustical connection between the secondary and tertiary resonance chambers and the partition 58 is secured circumferentially to the shell 50 and is spaced circumferentially from the tube 53 so as to provide an acoustical connection between the primary and secondary resonance chambers. In the portion of the tube 53 which is located within the primary resonance chamber 54, there is provided an opening 59 which is surrounded by a tube 60 which projects into the primary resonance chamber and acoustically connects the passage 53 with the primary resonance chamber.

The resonance unit which is shown in Figure 5 of the drawings includes a cylindrical shell 70, heads 71 and 72 secured over the opposite ends of the shell and a tube 73 which extends through the heads and the interior of the shell and projects outwardly beyond the head 71 to provide an extension which is adapted to be connected to the air intake conduit of a carburetor. The interior of the shell is divided into a primary resonance chamber 74 and a secondary resonance chamber 75 by a partition 76 whose outer and inner peripheries are secured, respectively, to the shell 70 and the tube 73. To establish communication between the tube 73 and the primary resonance chamber 74, there is provided in the tube an opening 77. To establish communication between the primary and secondary resonance chambers, there is provided an opening 78 which extends through the partition 76.

The resonance unit which is shown in Figure 6 of the drawings includes a cylindrical shell 80 over one end of which is secured a head 81. Within the other end of the shell, there is located a cup-shaped element 82 which is of smaller diameter than the shell and whose open outer end is substantially coterminous with the shell. The cup-shaped element 82 is circumferentially spaced from and secured to the shell by an annulus 83. Into the the interior of the cup-shaped element 82, there projects a tube 84 to whose outer end the air intake conduit of a carburetor is adapted to be connected and which is secured to and circumferentially spaced from the walls of the cup-shaped element by longitudinally extending ribs 85. The space bounded by the shell 80, the cup-shaped element 82, the annulus 83 and the head 81, is divided into primary, secondary and tertiary resonance chambers 86, 87, and 88, respectively, by partitions 89 and 90. To establish communication between the interior of the cup-shaped element 82 and the primary resonance chamber 86, there is provided a tube 91 which extends through the partitions 89 and 90 and communicates at its opposite ends with the interior of the cup-shaped element and the primary resonance chamber. Communication between the primary and secondary resonance chambers is established by a tube 92 which extends through the partition 90, and communication between the secondary and tertiary resonance chambers is established by a tube 93 which extends through the partition 89.

The resonance unit which is shown in Figure 7 of the drawings includes a shell 100 over whose opposite ends there are secured heads 101 and 102. Through the heads and through the interior of the shell, there extends a tube 103 which projects outwardly beyond the head 101 to provide an extension to which the air intake tube of a carburetor may be connected. The portion of the tube 103 within the shell 100 is riddled with relatively small openings 104 and is surrounded by a tube 105 which is of larger diameter than the tube 103 and between which and the tube 103 is located a layer of sound absorbing material 106. The space between the tube 105 and the shell 100 is divided by a partition 107 into primary and secondary resonance chambers 108 and 109, respectively. To establish communication between the main gas and sound and/or other pressure wave passage 103 and the primary resonance chamber, there is provided a tube 111 which communicates at its opposite ends with the passage 103 and the interior of the primary resonance chamber. Communication between the primary and secondary resonance chambers is established by a tube 110 which extends through the partition 107.

Except for the addition of the sound absorbing material and the changes in structure necessary to its incorporation therein, the resonance unit shown in Figure 7 does not differ essentially from that which is shown in Figure 5. The structure which is shown in Figure 7 may be modified by using, as a sound absorbent, a moulded material, thus making it unnecessary to extend the tube 103 through the interior of the shell 100.

The resonance unit which is shown in Figure 8 of the drawings includes a shell 120 over whose opposite ends there are secured heads 121 and 122. Through the heads and through the interior of the shell, there extends a tube 123 which projects outwardly beyond the head 121 to provide an extension to which the air intake tube of a carburetor may be connected. The space between the shell 120 and the tube 123 is divided by partitions 124, 125 and 126 into primary resonance chambers 127 and 128 and secondary resonance chambers 129 and 130. To establish communication between the primary resonance chambers 127 and 128 and the main gas and sound and/or other pressure waves passage 123, there are provided tubes 131 and 132 which communicate at their opposite ends with the passage 123 and with the interiors of the primary resonance chambers 127 and 128, respectively. Communication between the primary resonance chamber 127 and the secondary resonance chamber 129 and between the primary resonance chamber 128 and the secondary resonance chamber 130 is established by tubes 133 and 134 which extend through the partitions 124 and 126, respectively. The primary resonance chamber 128 and the secondary resonance chamber 129 are also acoustically interconnected by a tube 135 which extends through the partition 125. The tube 135 may be omitted in which event the resonance unit which is shown in Figure 8 will be equivalent to two resonance units of the type which are shown in Figures 2 and 5, independently connected to the main passage 123.

The resonance unit which is shown in Figure 9 of the drawings includes a shell 140 whose opposite ends are closed by heads 141 and 142. Through the heads and through the interior of the shell, there extends a tube 143 which projects outwardly beyond the head 141 to provide an extension to which the air intake tube of a carburetor may be connected. The space between the tube 143 and the shell 140 is divided into primary and secondary resonance chambers 144 and 145, respectively, by a tube 146 which surrounds and is circumferentially spaced from the tube 143 and is secured at its opposite ends to the heads 141 and 142, respectively. To establish communication between the main gas and sound and/or other pressure wave passage 143 and the primary resonance chamber 144, there is provided a tube 147 which communicates at its opposite ends with the main passage and the interior of the primary resonance chamber. Communication between the primary resonance chamber and the secondary resonance chamber is established by a tube 148 which extends through the tube 146.

For any of the resonance chambers which are incorporated in the resonance units which are shown in Figures 1 to 9 and 11 to 15 of the drawings, there may be substituted tuning pipes. In Figure 10 of the drawings, there is shown a resonance unit which is similar to those which are shown in Figures 2, 5 and 9 of the drawings except for the fact that there has been substituted for the primary resonance chamber a tuning pipe. The resonance unit which is shown in Figure 10 of the drawings includes a tube 150 which constitutes a main gas and sound and/or other pressure wave passage and a tuning pipe 151 which communicates at one end with the main passage and is closed at its other end by a cap 152. An intermediate portion of the tuning pipe 151 is surrounded by a shell 153 which is circumferentially spaced from and secured to the tuning pipe by heads 154 and 155. Communication between the interior of the tuning pipe 151 and the interior of the shell 153 is established by an opening 156 which is formed in the side wall of the tuning pipe. It will be noted that in this structure which combines the features of a tuning pipe type and a resonance chamber type unit, the tuning pipe replaces the primary resonance chamber and the chamber 153 functions as a secondary resonance chamber. As is known, a tuning pipe of the type shown in Figure 10 will, when connected to a passage through which sound and/or other pressure waves are passing in the manner shown in Figure 10, damp out the waves whose frequencies are four times the length of the pipe. The effect of connecting a resonance chamber to the tuning pipe may be calculated by methods analogous to these set forth by Lord Rayleigh.

The resonance unit which is shown in Figure 11 of the drawings includes a shell 160 over whose opposite ends there are secured heads 161 and 162. Through the heads and through the interior of the shell there extends a tube 163 which projects outwardly beyond the head 161 to provide an extension to which the air intake tube of a carburetor may be connected. The space between the shell 160 and the tube 163 is divided by partitions 164, 165, and 166 into primary, secondary, tertiary and quaternary resonance chambers 167, 168, 169 and 170, respectively. Communication between the main gas and sound and/or other pressure wave passage 163 and the primary resonance chamber 167 is established by a tube 171 which communicates at its opposite ends with the main passage and the interior of the primary resonance chamber. The primary resonance chamber is acoustically connected to the secondary resonance chamber, the tertiary resonance chamber and the quaternary resonance chamber by tubes 172, 173 and 174 which extend through the partition 164, the partitions 164 and 165 and the partitions 164, 165 and 166, respectively. The secondary resonance chamber is acoustically connected to the tertiary resonance chamber and the quaternary resonance chamber by tubes 175 and 176 which extend through the partition 165 and the partitions 165 and 166, respectively. The tertiary resonance chamber is acoustically connected to the quaternary resonance chamber by a tube 177, which extends through the partition 166. Obviously one or more of the tubes 172, 173, 174, 175, 176 and 177 may be omitted and the characteristics of the resonance unit thus changed.

The resonance unit which is shown in Figure 12 of the drawings includes a shell 180 whose opposite ends are closed by heads 181 and 182, respectively. Through the heads 181 and 182 and through the interior of the shell, there extends a tube 183 which projects beyond the head 181 to provide an extension to which the air intake tube of a carburetor may be connected. The space between the shell 180 and the tube 183 is divided by partitions 184 and 185 into a primary resonance chamber 186 and secondary resonance chambers 187 and 188, respectively. Communication between the main gas and sound and/or other pressure wave passage 183 and the primary resonance chamber 186 is established by a tube 189 which communicates at its opposite ends with the main passage and the interior of the primary resonance chamber. The primary resonance chamber 186 and the secondary resonance chambers 187 and 188 are acoustically interconnected by tubes 190 and 191 which extend through the partitions 184 and 185, respectively. The two secondary resonance chambers are also acoustically interconnected by a tube 192 which extends through the partitions 184 and 185. To an intermediate portion of the tube 192, there is connected a tube 193 which extends through the wall of the shell 180 and communicates with the atmosphere. The tube 192 and/or the tube 193 may be omitted and the characteristics of the resonance unit thus changed.

The resonance unit which is shown in Figure 13 of the drawings includes a shell 200 over whose opposite ends there are secured heads 201 and 202, respectively. The interior of the shell is divided into primary resonance chambers 203 and 204, respectively, secondary resonance chambers 205 and 206, respectively, and a gas entrance compartment 207 by partitions 208, 209, 210 and 211. The greater portion of the side wall of the shell 200 which surrounds the gas entrance compartment 207 is cut away to provide gas entrance openings 212. Through the head 201 and through the partitions 208 and 209, there extends a tube 213 which communicates with the gas entrance compartment 207 and which projects outwardly beyond the head 201 to provide an extension to which the air intake tube of a carburetor may be connected. Communication between the compartment 207 and the primary resonance chambers 203 and 204 is established by tubes 214 and 215 and tubes 216 and 217 which extend through the partitions 209 and 210, respectively. The primary resonance chambers 203 and 204 are acoustically interconnected with the secondary resonance chambers 205 and 206 by the tubes 218 and 219 which extend through the partitions 208 and 211, respectively.

The resonance unit which is shown in Figure 14 of the drawings includes a tube 220 which constitutes a main sound and/or other pressure wave passage and a shell 221 over whose opposite ends there are secured heads 222 and 223, respectively. The interior of the shell 221 is divided longitudinally into a sub-primary resonance chamber 224 and a compartment by a partition 225. The compartment is subdivided radially into an outer annular compartment and an inner cylindrical compartment by a tubular partition 226. The outer annular compartment is subdivided longitudinally into a secondary resonance chamber 227, a secondary sub-secondary resonance chamber 228 and a tertiary resonance chamber 229 by partitions 230 and 231, respectively. The inner cylindrical compartment is subdivided longitudinally by partitions 232 and 233 into a primary resonance chamber 234, a secondary resonance chamber 235 and a sub-secondary resonance chamber 236, through which and the partitions 232 and 233 extends a tube 237 which connects the primary resonance chamber 234 with the secondary resonance chamber 235.

The main gas and sound and/or other pressure wave passage 220 is connected to the resonance unit proper by a tube 238 which extends through the head 222 and the partition 225 and communicates at its opposite ends with the main passage and the primary resonance chamber 234, respectively. Communication between the interior of the tube 238 and the sub-primary resonance chamber 224 is established by an opening 239 which extends through the wall of the tube. Communication between the primary resonance chamber 234 and the secondary resonance chamber 227 is established by a tube 240 which extends through the partition 226. Communication between the tube 237 and the sub-secondary resonance chamber 236 is established by an opening 241 which extends through the wall of the tube. Communication between the sub-secondary resonance chamber 236 and the secondary sub-secondary resonance chamber 228 is established by a tube 242 which extends through the partition 226. Communication between the secondary resonance chamber 235 and the tertiary resonance chamber 229 is established by a tube 243 which extends through the partition 226.

The resonance unit which is shown in Figure 15 of the drawings includes an outer shell 260 which is closed at one end and an inner shell 261 which is of smaller diameter than the outer shell, is located within the interior thereof and is spaced therefrom by spacers, such as 262. Over the opposite ends of the inner shell 261, there are secured heads 263 and 264 of which the latter is shown as formed integrally with the tube 265 which extends through the interior of the shell and the head 263 and projects outwardly beyond the head 263 to form an extension to which the air intake tube of a carburetor may be connected. The interior of the inner shell 261 is divided into a primary resonance chamber 266 and a secondary resonance chamber 267 by a partition 268. Communication between the gas and sound and/or other pressure wave passage 265 and the primary resonance chamber and between the primary resonance chamber and the secondary resonance chamber is established by a tube 269 which extends through the wall of the passage 265 and a tube 270 which extends through the wall of the partition 268, respectively. For the purpose of silencing "hiss" the closed end of the outer shell 260 may be lined with a suitable sound-absorbing material 271 which is held in place by a wire mesh screen 272.

It is thought that the manner in which the resonance units which are shown in Figures 3 to 15 of the drawings function will be apparent from what has hereinbefore been stated.

It will, of course, be understood that the resonance unit 13 which is shown in Figures 1 and 3 of the drawings may be used with the tube 43 telescopically connected with the air intake tube of a carburetor if there is provided a gas intake passage in the head 41 and a tube of smaller diameter than the tube 47 connected to the head, communicating with the opening therein and extending through the tube 47 into the tube 43.

The resonance units which are shown in Figures 2, 4, 5, 6, 7, 8, 9, 11, 12, 13 and 15 of the drawings may be used in an installation such as that in which the resonance unit which is shown in Figures 1 and 3 of the drawings is used if the intake ends of their main gas and sound and/or other pressure wave passages are closed and the features of the constructions thereby rendered useless eliminated.

The resonance units shown in Figures 10 and 14 of the drawings may be used in an installation such as that in which the resonance unit which is shown in Figures 1 and 3 of the drawings is used if their main gas and sound and/or other pressure wave passages are eliminated.

The characteristics of the resonance units herein disclosed may be modified, if desired, by lining any or all of the resonance chambers with sound absorbing material and/or by lining or packing any or all of the connecting passages with a suitable sound absorbing material.

It will be apparent that although I have described the resonance units herein disclosed as adapted for use on the induction system of an internal combustion engine, resonance units of the same type may be employed on the exhaust system of an internal combustion engine on the intake pipe and/or the exhaust pipe of a gas compressor, on the crankcase of an internal combustion engine, and, in fact, on any conduit through which sound and/or other pressure waves which are to be attentuated or modified pass or on any compartment in which such waves occur.

While it will be understood that it may be desirable to employ on the exhaust systems of internal combustion engines somewhat differently designed resonance units than are employed on the induction systems of such engines and that, in general, it may be desirable to employ on the exhaust systems of internal combustion engines resonance units in which there are provided a larger number of primary resonance chambers as well as sub-primary, secondary, tertiary, etc., resonance chambers, than are necessary in resonance units which are designed for use on the induction systems of such engines, I have, for the purpose of illustrating the application of my invention to the exhaust system of an internal combustion engine, shown in Figure 1 of the drawings the resonance unit 120 which is shown in Figure 8 of the drawings connected to the exhaust pipe 11 of the engine 7.

The resonance unit 120, it will be noted, is connected to the exhaust pipe 11 of the engine with the extension of the tube 123 telescopically connected with the portion of the exhaust pipe on the engine side of the resonance unit. It will, of course be apparent that although the direction of the travel of gases through the tube 123 will be different when the resonance unit is employed on the exhaust system of the engine than when it is employed on the induction system, the direction of travel of sound and/or other pressure waves therethrough will be the same in both cases. It will, of course, be understood that when the resonance unit 120 is intended to be employed on the exhaust system of an engine, it will be designed to respond to and attenuate the sound and/or other pressure waves which pass through the exhaust pipe so as to silence the noises issuing from the exhaust system of the engine and to increase the power of the engine, in the manner hereinbefore described.

I claim:

1. In a device of the class described, a passage which includes two partly telescoped elements which are spaced apart throughout a portion of their circumferences and through which pressure waves are adapted to travel, a plurality of resonance chambers disposed around the passage and so arranged that communication between one of the chambers and the passage is established through the space between the elements, and an opening or openings for permitting communication between the several resonance chambers.

2. In a device of the class described, a cylindrical shell, a head closing each end of the shell, an imperforate tube secured around an opening in one of the heads and projecting into the interior of the shell, a tube secured around an opening in the other head and projecting into the interior of the shell and surrounding and circumferentially spaced from a portion of the first-mentioned tube, and a partition within the shell secured to the second mentioned tube and to the shell and dividing the interior of the shell into two compartments of which both communicate with the duct defined by the specified tubes.

3. In a device of the class described, a cylindrical shell, a head closing each end of the shell, a tube secured around an opening in one of the heads and projecting into the interior of the shell, a tube secured around an opening in the other head and extending into the interior of the shell and surrounding and circumferentially spaced from a portion of the first mentioned tube, a partition which is secured to the second mentioned tube and to the shell and divides the interior of the shell into two compartments into one of which the second mentioned tube projects, a tube extending through the partition and into the compartment into which the second mentioned tube opens to a point at a distance from the point at which the second mentioned tube opens thereinto, and a hood secured over the end of the shell through which the first mentioned opening extends.

4. In combination, an inclosure within which objectionable sound waves occur, and a unit, comprising a resonator which communicates with the interior of the inclosure, a second resonator which communicates with the first mentioned resonator and a vent which establishes communication between one of the resonators and the atmosphere, which is so proportioned and dimensioned that it responds to and attenuates by resonance objectionable sound waves which occur within the inclosure.

5. In combination, an inclosure within which objectionable sound waves occur, and a unit, comprising a resonator which communicates with the interior of the inclosure and a vent which establishes communication between the resonator and the atmosphere, which is so proportioned and dimensioned that it responds to and attenuates by resonance objectionable sound waves which occur within the inclosure.

6. The invention claimed in claim 3 in which the hood is lined with sound absorbing material.

7. In a device of the class described, a main passage through which objectionable sound waves are adapted to travel and which includes a branched passage communicating at one end with a single passage, and a resonator, which is so proportioned and dimensioned that it responds to and attenuates by resonance objectionable sound waves which travel through the main passage, communicating with the main passage adjacent the junction of the constituent passages.

8. In a device of the class described, a main passage which includes a branched passage communicating at one end with a single passage, and a resonance unit designed to respond to and attenuate certain of the pressure waves which travel through the main passage—said resonance unit including a plurality of intercommunicating resonators of which one communicates with the main passage adjacent the junction of the constituent passages.

9. In a device of the class described, a main passage through which objectionable sound waves are adapted to travel and which includes a pair of telescopically related passages which are so arranged that gases flow therethrough in opposite directions, and a resonator, which is so proportioned and dimensioned that it responds to and attenuates by resonance objectionable sound waves, communicating with the main passage adjacent the junction of the constituent passages.

10. In sound wave attenuating apparatus, a passage which includes a perforate, generally tube-like element, a generally tube-like element which surrounds a portion of the first-mentioned element and is spaced radially therefrom to form an inner annular compartment, a generally tube-like shell which surrounds a portion of the second-mentioned element and is spaced radially therefrom to form an outer annular compartment, sound absorbing material in the inner annular compartment—the outer annular compartment being in communication with the passage and constituting an element of a unit which is so proportioned and dimensioned that it responds to and attenuates by resonance sound waves which travel through the passage.

11. In a silencer, means providing a through passage for gases to be passed through said silencer and including an inner shell having a large portion of its area covered with a large number of relatively small holes, a second shell telescoped around said inner shell, sound wave attenuating means in the annular space between said shells, and means providing a plurality of resonators nested around said second shell and in communication with the through passage.

12. In a through type silencer including three nested shell devices providing two annular spaces therebetween, the inner one of which is in communication with a through passage through the inner shell, sound wave attentuating means in the inner annular space, means cooperating with certain of the shells to form a chamber in the outer annular space in which sound waves are attenuated, the chamber being substantially completely closed except in a zone the ratio of whose length to the length of the chamber is a relatively small fraction, and a sound wave ingress hole in the zone so that the chamber will function to attenuate sound waves.

13. In an internal combustion engine, a duct which communicates with a cylinder of the engine and through which gases and sound waves travel during operation of the engine, the duct including two partly telescoped, radially spaced generally tubular elements, a resonator which is arranged as a branch of the duct and is so tuned that it responds to and attenuates by resonance the sound waves of a pre-selected frequency which travel through the duct, the resonator including a wall which encircles and is radially spaced from a portion of the duct, and walls which with the generally tubular elements and the first-specified wall define a compartment which communicates with the duct through the space between the telescoped portions of the generally tubular elements.

14. In an intake silencer, a duct through which gases and sound waves may travel, a resonator which is arranged as a branch of the duct and is so tuned that it responds to and attenuates by resonance the sound waves of a pre-selected frequency which travel through the duct, the resonator including a wall which surrounds and is radially spaced from a portion of the duct, walls which with the duct and the first-specified wall define a compartment, and means which establishes restricted communication between the compartment and the duct, and a cap which is disposed over the intake end of the duct and located in proximity to the nearest of the second-specified walls of the compartment and defines therewith a compartment which communicates with the duct and the atmosphere.

15. In an intake silencer, a duct through which gases and sound waves of different frequencies may travel, a resonator which is arranged as a branch of the duct and is so tuned that it responds to and attenuates by resonance the sound waves of a pre-selected relatively low frequency which travel through the duct, the resonator including a wall which encircles and is radially spaced from a portion of the duct, walls which with the duct and the first specified wall define a compartment, and means which establishes restricted communication between the compartment and the duct, a cap which is disposed over the intake end of the duct and located in proximity to the nearest of the second-specified walls of the compartment and defines therewith a compartment which communicates with the duct and the atmosphere, and sound absorbing material which constitutes a lining for the cap and attenuates sound waves of relatively high frequency which travel through the duct.

16. In a silencer, a duct through which gases and sound waves may travel, a hood which is telescopically related to and spaced from the walls of the duct, and a resonator which is carried by the hood and includes a chamber which communicates with the interior of the hood.

17. In a silencer, a duct through which gases and sound waves may travel, a hood which is telescopically related to and spaced from the walls of the duct, and a resonator which communicates with the interior of the hood, the resonator including a wall which encircles and is radially spaced from a portion of the hood, walls which with the hood and the first-specified wall define a compartment, and means which establishes restricted communication between the compartment and the interior of the hood.

18. In a silencer, a duct through which sound waves may travel, a wall which encircles and is radially spaced from a portion of the duct, walls which with the duct and the first-specified wall define a compartment which encircles and communicates with and constitutes a branch of the duct, and sound absorbing material which constitutes a lining for a portion of the duct which is encircled by the compartment.

19. In a silencer, a duct through which gases and sound waves of different frequencies may travel, and a resonator which is arranged as a branch of the duct and is so tuned that it responds to and attenuates by resonance the sound waves of pre-selected frequencies which travel through the duct, the resonator including a wall which encircles and is radially spaced from a portion of the duct, walls which with the duct and the first-specified wall define a compartment, a wall which sub-divides the compartment longitudinally into two chambers, means which establishes restricted communication between the compartment and the duct, and a tubular element which extends through the last-specified wall and establishes restricted communication between the two chambers.

20. In a silencer, a duct through which gases and sound waves of different frequencies may travel, the duct including two partly telescoped, radially spaced, generally tubular elements, and a resonator which is arranged as a branch of the duct and is so tuned that it responds to and attenuates by resonance the sound waves of pre-selected frequencies which travel through the duct, the resonator including a wall which encircles and is radially spaced from a portion of the duct, walls which with the generally tubular elements and the first-specified wall define a compartment which communicates with the duct through the space between the telescoped portions of the generally tubular elements, a wall which sub-divides the compartment longitudinally into two chambers, and a tubular element which extends through the last-specified wall and establishes restricted communication between the two chambers.

21. In a silencer, a duct through which gases and sound waves may travel, a wall which encircles and is radially spaced from a portion of the duct, walls which with the duct and the first specified wall define a compartment, a wall which is joined to the first specified wall and to the duct and subdivides the compartment longitudinally into two chambers which encircle the duct and of which one is except through the other substantially closed to the atmosphere, a passage which enters the last mentioned chamber between the ends of the compartment and establishes communication between the compartment and the duct, and an orifice in the last specified wall which establishes communication between the chambers.

22. In a silencer, a duct through which gases and sound waves may travel, a wall which encircles and is radially spaced from a portion of the duct, walls which with the duct and the first specified wall define a compartment, a wall which subdivides the compartment into two chambers which encircle the duct and of which one is except through the other substantially closed to the atmosphere, a passage which enters the last mentioned chamber between the ends of the compartment and establishes communication between the compartment and the duct, and a tube which extends through the wall which subdivides the compartment and establishes communication between the two chambers.

23. In a silencer, a duct through which gases and sound waves may travel, the duct including two partly telescoped, radially spaced, generally tubular elements, a wall which encircles and is radially spaced from a portion of the duct, walls which with the generally tubular elements and the first specified wall define a compartment, a wall which subdivides the compartment into two chambers which encircle the duct and of which one communicates with the duct through the space between the generally tubular elements and the other is except through the first substantially closed to the atmosphere, and means which establishes communication between the chambers.

24. In a silencer, a duct through which gases and sound waves may travel, the duct including two partly telescoped, radially spaced, generally tubular elements, a wall which encircles and is radially spaced from a portion of the duct, walls which with the generally tubular elements and the first specified wall define a compartment which is disposed without the path of travel of gases through the silencer, and a wall which subdivides the compartment longitudinally into two chambers which encircle and communicate with the duct.

25. In combination, a duct through which gases and sound waves travel, a resonator which is arranged as a branch of the duct and is so tuned that it responds to and attenuates by resonance the sound waves of a preselected frequency which travel through the duct, the resonator including a wall which encircles and is radially spaced from a portion of the duct, walls which with the duct and the first specified wall define a compartment, and a generally tubular element which establishes restricted communication between the compartment and the duct.

26. In an intake silencer, a duct in which there are included two partly telescoped, radially spaced generally tubular elements, a wall which encircles and is radially spaced from a portion of the duct, walls which with the generally tubular elements and the first-specified wall define a compartment which communicates with the duct through the space between the telescoped portions of the generally tubular elements, and a cap which is disposed over the intake end of the duct and located in proximity to the nearest of the second-specified walls and is so constructed and supported from a wall of the compartment that air may travel between the cap and the nearest of the second-specified walls from the atmosphere to a point within the boundaries of a projection of the duct without suddenly changing its direction of flow or encountering substantial obstruction.

27. The intake silencer specified by claim 26 in which the cap is lined with sound absorbing material.

28. In an intake silencer, a duct through which gases and sound waves may travel, a wall which encircles and is radially spaced from a portion of the duct, walls which with the duct and the first-specified wall define a compartment which communicates with and constitutes a branch of the duct, a cap which is disposed over the intake end of the duct and is located in proximity to the nearest of the second-specified walls and defines therewith a compartment which communicates with the duct, means through which air may enter the last-mentioned compartment radially throughout a substantial proportion of its circumference, a lining of sound absorbing material for the cap, and a facing of sound absorbing material for that of the second-specified walls which is nearest the cap.

29. In a silencer, a duct through which gases and sound waves may travel, the duct including two partly telescoped, radially spaced generally tubular elements, a wall which encircles and is radially spaced from a portion of the duct, walls which with the generally tubular elements and the first-specified wall define a compartment which communicates with the duct through the space between the generally tubular elements, a wall which is joined to the first-mentioned wall and to one of the tubular elements and subdivides the compartment into two chambers which encircle the duct and of which one is except through the other substantially closed to the atmosphere, and an orifice in the last-specified wall which establishes communication between the chambers.

30. In combination, a duct through which sound waves and gases travel, a resonator which is arranged as a branch of the duct and is so tuned that it responds to and attenuates by resonance the sound waves of preselected frequencies which travel through the duct, the resonator including a wall which encircles and is radially spaced from a portion of the duct, walls which with the duct and the first-specified wall define a compartment, a wall which subdivides the compartment into two chambers, means which establishes restricted communication between the compartment and the duct, and a tube which extends through the last-specified wall and establishes restricted communication between the chambers.

31. The combination, with a duct in which there is included a generally tubular element through which sound waves and gases travel, of a resonator which is arranged as a branch of the duct and is so tuned that it responds to and attenuates by resonance sound waves of a preselected frequency which travel through the duct, the resonator including a hollow cap which is disposed over one end of the generally tubular element and an orifice in the wall of the cap nearest the end of the generally tubular element over which the cap is disposed.

32. The combination, with a duct through which sound waves and gases may travel, of a silencer in which there is included a resonator which is arranged as a branch of the duct and is so tuned that it responds to and attenuates by resonance sound waves of a preselected frequency which travel through the duct, the silencer including chambers which communicate with the duct and of which one encircles the duct and another the first-mentioned.

33. In combination, a duct through which sound waves and gases travel, a resonator which is arranged as a branch of the duct and is so tuned that it responds to and attenuates by resonance the sound waves of preselected frequencies which travel through the duct, the resonator including a wall which encircles and is radially spaced from a portion of the duct, walls which with the duct and the first-specified wall define a compartment, a wall which subdivides the compartment into two chambers, means which communicates directly with a portion of the duct which is encircled by the first-specified wall and lies between the second-specified walls and establishes restricted communication between the compartment and the duct, and means which establishes restricted communication between the two chambers.

ERNEST E. WILSON.